United States Patent [19]

Miani

[11] Patent Number: 4,915,764
[45] Date of Patent: Apr. 10, 1990

[54] METHOD OF MAKING PANELS

[75] Inventor: Mario Miani, Via E. Fermi 9, 20017 Rho (Provincin Di Milano), Italy

[73] Assignee: Mario Miani, Milan, Italy

[21] Appl. No.: 55,958

[22] Filed: Jun. 1, 1987

[51] Int. Cl.$^4$ .............. B32B 27/20; B29C 47/10; B29C 47/40

[52] U.S. Cl. .............. 156/244.19; 156/244.24; 156/299; 156/269; 264/102; 264/171; 264/148; 264/211.21; 264/211.23; 264/271.1; 264/DIG. 57

[58] Field of Search .......... 264/171, 101, 102, 211.21, 264/211.23, 165, DIG. 57, 148, 271.1; 366/318, 85, 75, 76; 425/203, 204, 208; 156/244.11, 244.19, 244.24, 299, 269

[56] References Cited

U.S. PATENT DOCUMENTS

| | | | |
|---|---|---|---|
| 3,661,363 | 5/1972 | Aletti | 425/208 |
| 3,666,386 | 5/1972 | McElroy et al. | 425/208 |
| 3,676,034 | 7/1972 | Wendricks | 425/208 |
| 4,663,103 | 5/1987 | McCullough et al. | 264/211.23 |
| 4,708,623 | 11/1987 | Aoki et al. | 264/211.23 |

FOREIGN PATENT DOCUMENTS

| | | |
|---|---|---|
| 0058101 | 1/1981 | European Pat. Off. . |
| 0165093 | 4/1984 | European Pat. Off. . |
| 0172436 | 7/1984 | European Pat. Off. . |
| 2564374 | 5/1984 | France . |
| 651782 | 6/1981 | Switzerland . |

Primary Examiner—Hubert C. Lorin
Attorney, Agent, or Firm—Guido Modiano; Albert Josif

[57] ABSTRACT

A method for making panels comprises the steps of forming a mixture of thermoplastic resin and organic filler and the plastication of this mixture performed simultaneously with its formation. During the transfer of the organic filler to the subsequent mixing and plastication step, the same is desiccated and mixed. Moreover, during said mixing and plastication step the plasticated mixture is transferred to a subsequent extrusion step. The method is carried out in an apparatus including a single device for the continuous production of a sheet of extruded material.

19 Claims, 2 Drawing Sheets

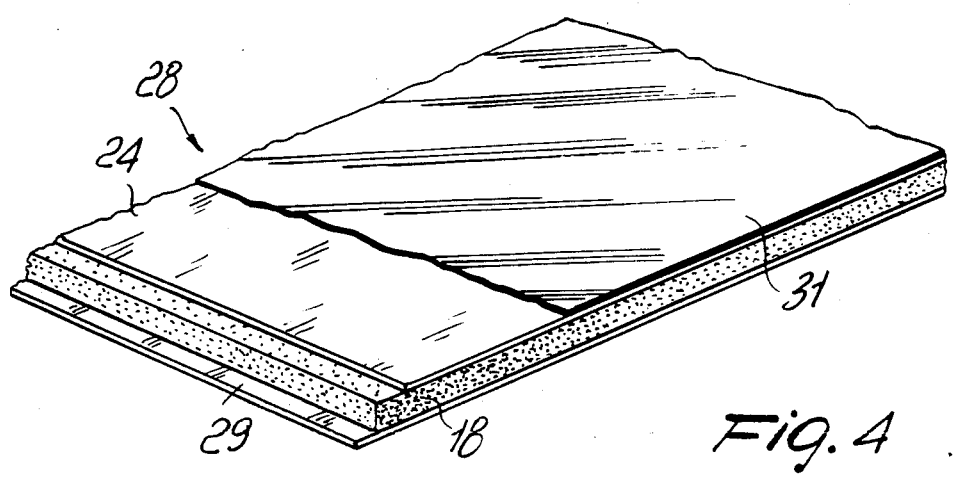
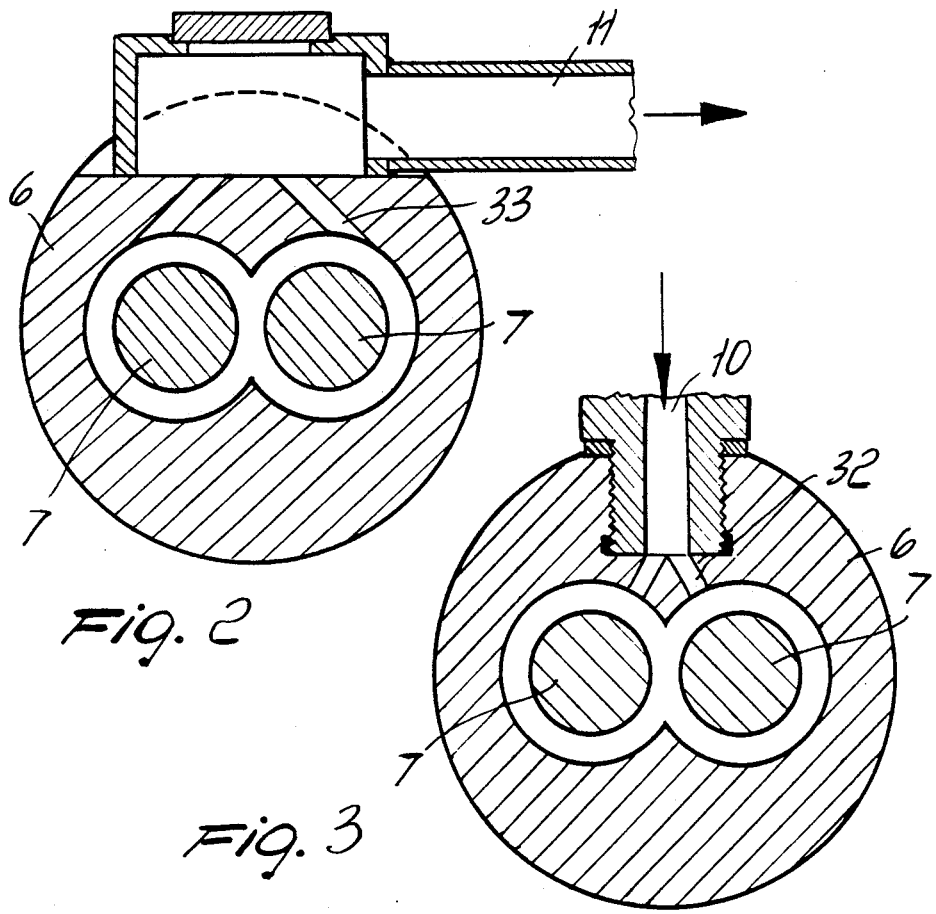

METHOD OF MAKING PANELS

BACKGROUND OF THE INVENTION

The present invention relates to a method for making panels, to the apparatus for providing this method and to the panels obtained thereby.

The panels whereto the present invention relates consist of essentially stratified flat structures with uniform thickness. These can be successively heat-molded after the step which provides their formation and can be used, indeed as panels, to form finished items such as, for example, internal coverings of automotive vehicles.

The starting material for the preparation of these panels substantially consists of a thermoplastic resin and an organic filler. Conventional methods and the related devices for producing these panels entail a separate mixing step, wherein a certain amount of a thermoplastic resin is placed in close contact with the organic filler. The latter substantially consists of wood powder or sawdust, desiccated in a step previous to the mixing step, stored and then transferred to the subsequent processing steps (with problems of protecting the desiccated product from external humidity). In known methods and devices of the type at issue, the particles or fragments of organic filler must be sifted and selected, since they must have (due to processing requirements) controlled and uniform dimensions. Furthermore, they must be added to the mix in amounts not exceeding 60% by weight, while it would be preferable to use greater amounts of this less expensive component. The aforementioned mixture is traditionally prepared in a turbomixer and the mixture thus obtained is subsequently transferred to a plastication and extrusion unit, provided separately from the previous units, and whereto corresponds a separate step of conventional methods. The material thus extruded is subsequently laminated. In traditional devices, lamination is performed in a device with rollers or cylinders which subjects the layer of material in output from the extruder to a traction force. This force can in turn lead to discontinuities and irregularities on the surface of the finished panel, or even lacerate the layer of extruded material. The panel laminated with known devices is furthermore "uncovered", that is, it does not have the coatings and reinforcements which may instead be required for particular final applications of the panels. The transfer of the desiccated organic filler to the mixing step and the transfer of the mixture to the plastication and extrusion unit is a problem of known devices and methods, as well as for the above described reasons, also due to the fact that they make the overall process longer and more troublesome, and increase the complexity of the apparatus by means of which this method is carried out.

SUMMARY OF THE INVENTION

The main aim of the present invention is to provide a method and the related apparatus allowing to obtain panels with a smaller number of steps with respect to known methods, in a simpler and more rapid manner, and starting from organic filler fragments with non-uniform shape and size and with an initial humidity content even higher than the values allowed by the prior art.

A further object of the present invention is to provide an apparatus of the type mentioned, wherein the lamination unit does not cause breakages or discontinuities on the surface of the panels, and which furthermore performs, if required, their coating and reinforcement according to the requirements of the final use of these panels.

Another object of the invention is to provide panels usable for molding, the composite material whereof is less expensive with respect to traditional materials and anyway still lightweight.

Still another object of the invention is to provide a wood powder extrusion which, after leaving most of the original moisture content at the first processing region, is totally coated with plastic material injected in the melted state, leaving practically intact its initial filament-like structure, which remains essentially unaltered even after the mixing and compacting step, obtained at low pressure. This method also entails remarkable advantages for the final product, which has a greater mechanical resistance due the overlapping of the wood powder fibers.

Moreover, the panel has a reduced specific weight due to the low-pressure mixing and compacting, contrarily with respect to panels obtained with the prior art which cause a degradation and a disintegration of the wood powder, caused by the high pressure used to melt the plastic material mixed with the wood powder, obtaining panels with a specific weight of even 1.05 kg/dm$^3$.

These and other objects are achieved by the method according to the present invention for making panels starting from a thermoplastic resin and an organic filler of the type comprising the mixing of said resin with said organic filler, the plastication and the extrusion of the mixture thus obtained and the lamination of the extruded material, substantially characterized in that it comprises, in a single step, the forming of said mix of melted thermoplastic resin and organic filler, and the plastication of said mixture. According to further characteristics of the method according to the present invention, said single mixing and plastication step begins with the re-mixing and the desiccation of the raw organic filler material, effected during the transfer of the organic filler to the mixing and plastication step. The latter, according to a further characteristic of the method according to the invention, is in turn performed during the transfer of the mixture of filler and thermoplastic resin to the subsequent extrusion step. Said organic filler, according to a further characteristic of the method according to the invention, is 60 to 80% by weight of the final mixture.

The aparatus for carrying out this method is substantially characterized in that it provides a single device for the continuous production of a slab of extruded material obtained starting directly from fragments of humid organic filler of irregular shape and size, and a melted thermoplastic resin.

The panels obtained according to the method and the apparatus described above are also object of the present invention and are substantially characterized in that they are provided with adapted protective coatings on their outer surface, as well as with a reinforcement material embedded in their thickness.

In fact, according to the present invevtion it has been surprisingly discovered that, starting from a melted thermoplastic resin and performing its mixing with an organic filler simultaneously with the plastication step, it is possible to use more than 60% by weight of organic filler having even irregular starting size and dimensions. The organic filler mixing and desiccation step provided continuously in the same mixing, plastication and extrusion apparatus allows to start from a still-humid organic filler but without the use of desiccation, storage and transfer units which are instead normally required in traditional devices of this kind. The transfer of the material to the extrusion step, performed simultaneously with the mixing and plastication steps, also has the advantage of making the process according to the invention generally rapid and simple, and of making the apparatus according to the invention less expensive and complicated.

BRIEF DESCRIPTION OF THE DRAWINGS

The invention is now described with reference to the figures of the accompanying drawings, which illustrate a preferred embodiment of the apparatus for making panels uable for re-molding, given only by way of non-limitative example of the invention, wherein:

FIGS. 2 and 3 are transverse cross section detail views of the apparatus of FIG. 1, respectively at its degassing region and at its resin feed region; and FIG. 4 is a perspective view in partial cross section of a panel, usable for re-molding, obtained with the apparatus of FIG. 1.

DESCRIPTION OF THE PREFERRED EMBODIMENTS

Figure 1:
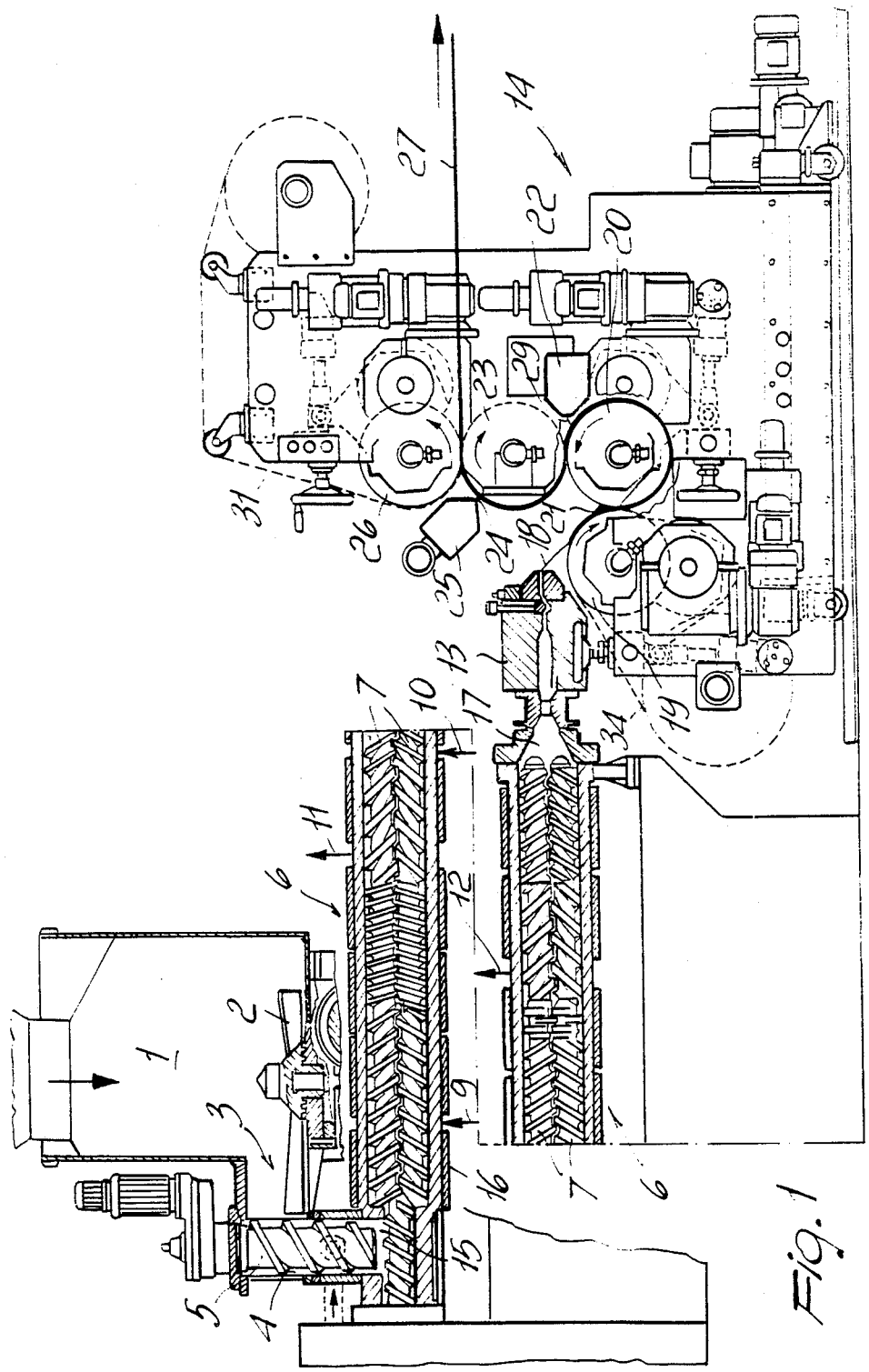
FIG. 1 is a longitudinal cross section view of the apparatus according to the invention.

The apparatus according to the invention comprises a tank 1 provided at the bottom with a rotatable blade 2 and with a lateral opening 3. At the latter there is a vertical material transfer conduit 4 contnrolled by a screw or volute feeder 5. The conduit 4 substantially connects the inner chamber of the tank 1 with the chamber of a device 6 inside which is provided a double volute or worm screw 7 with counterposed rotation. For the sake of ease and clarity of description, the double volute 7, which in use has screws arranged side-by-side on a horizontal plane (see FIGS. 2 and 3), is illustrated in FIG. 1 with screws or volutes arranged on a vertical plane. The form, the dimensions and the pitch of the screw of the volute 7 vary along its length so as to treat the material being processed in different manners according to its position inside the device 6. On the latter the resin feed sections 9 and 10 (FIG. 3) and the degassing sections 11 and 12 (FIG. 2) are also defined. These sections are in particular provided with small channels 32, 33 respectively for the ingress of resin into the device 6 and for the discharge of the vapors from the latter. At the end of the device 6 opposite to the end 15 connected to the tank 1 there is an extrusion head 13, downstream whereof is provided a lamination complex 14 which will be described in greater detail hereinafter.

The organic filler is fed inside the tank 1. The filler is composed of wood fragments (shavings, wood powder, sawdust) still humid and with irregular size and shape. It can be seen that neither the degree of humidity of the filler nor the dimensions or the possible aggregation between fragments are critical, so that it is possible to bulk feed the wood fragments to the tank 1 without having to perform a previous sifting or a verification of its degree of humidity.

By virtue of its rotation, the blade 2 causes the advancement of the wood fragments towards the lateral opening 3, from which they fall along the conduit 4 towards the inner chamber of the device 6; the screw or volute feeder 5 organic filler discharged into the device 6. In the portion of the double volute 7 comprised between the section 15 for the inlet of the organic filler into the device 6 and the resin supply section 10, the wood fragments are subjected to the following treatments: they are heated by the heater plates 16 provided on the skirt of the device 6, they are mixed favoring thereby the formation of a uniform organic mass and facilitating the removal of humidity, and are finally conveyed towards the further processing steps. In this first portion of the device, there substantially occurs a desiccation of the wood shavings, their treatment, so as to make the mass formed thereby homogeneous and uniform, and their movement along the device 6. This first portion also provides a section 9 for the inflow of a melted thermoplastic resin (polyethylene, polypropylene, polyvinylchloride) having substantially the function of lubricating the organic filler mass, thereby facilitating its transfer into the device 6. The resin, which is in any case not indispensable in this step, is fed in very small amounts. The release of the vapors through the degassing section 11 also occurs in this first portion of the device 6.

The actual introduction of the thermoplastic resin into the device 6 occurs at the section 10. The thermoplastic resin is added in a melted state, and is substantially composed of polyethylene, polypropylene, polyvinylchoride alone or in mixture. In the portion of device 6 comprised between the resin inlet section 10 and the section 17 immediately upstream of the extrusion head 13, the following processes simultaneously occur:

formation of a mixture of organic filler and thermoplastic resin; the amounts of the components fed to the device 6 being such that the mixture thus obtained contains from over 60% to 80% by weight of organic filler and from under 40% to 20% by weight of thermoplastic resin with respect to the overall weight of the mixture;

plastication of the mixture as it forms; also in this portion of the device 6, heater plates 16 are in fact provided, which soften the mixture;

transfer of the plasticated mixture to the subsequent extrusion step.

A degassing section 12 is also provided in this portion of device 6 comprised between the above described sections 10 and 17.

The plasticated mass, again under the thrust of the double volute 7, is extruded through the head 13 as a sheet-like paste material 18. The lamination device 14 comprises a calender, the rollers 19, 20 whereof are arranged below the extrusion head 13 so as to receive the material 18, paste-like and not very consistent, substantially by gravity feed. Indeed the material forms a small accumulation 21 on the calender which contributes to make the thickness of the layer of material more uniform and regular. Also, by acting on the distance and on the speed of the cylinders it is possible to achieve the accurate control of the dimensions of the sheet produced. The latter is covered on one side by a film of plastic material 29 of the same type as the material introduced into the device 6 at the film head 22, further laminated between the rollers 20 and 23, coated on the opposite side with another film of plastic material 24 (the same or different to the previous material) applied by means of the film head 25, further covered with a finishing material 31 (fabric, aluminum, etc.) and again laminated between the rollers 23 and 26. The stratified laminated material 27 at the output of the aparatus 14 is subsequently cooled and cut into panels 28 (FIG. 4).

A reinforcement 34 (FIG. 1), consisting, for example, of a metal net embedded into the thickness of the material 18, can be included in the layer 18 of extruded material originating from the head 13.

The panel 28 thus obtained can be further hot-molded to form items having different shapes, such as for example the dashboard and the other inner parts of the passenger compartment of automotive vehicles, packaging material, such as continuously heat-formed fruit-boxes and the like.

Naturally, the invention as described and illustrated above is susceptible to further modifications and variations without thereby abandoning the present scope of protection.

I claim:

1. Method of making panels from an organic filler and a thermoplastic resin selected from a group consisting of polyethylene, polypropylene and polyvinylchloride, alone or in mixture, said method comprising the steps of;
   providing an organic filler tank,
   bulk feeding said organic filler to said organic filler tank,
   moving at least some of said organic filler from said organic filler tank,
   substantially metering a quantity of said organic filler moved from said organic filler tank to provide a substantially metered quantity of organic fiber,
   providing a double volute,
   moving said substantially metered quantity of organic filler to said double volute,
   counter rotating said double volute thereby mixing said organic filler and conveying said organic filler along said double volute,
   heating said organic filler thereby substantially desiccating said organic filler,
   feeding at least one first charge of thermoplastic resin into said organic filler, thereby substantially lubricating said organic filler,
   degassing said organic filler and said first charge of thermoplastic resin,
   adding at least one second charge of thermoplastic resin to said organic filler and said first charge of thermoplastic resin to form a mixture containing from over 60% to 80% by weight of organic filler and from under 40% to 20% by weight of thermoplastic resin,
   degassing said mixture,
   plasticizing said mixture to form a plasticated mixture,
   extruding said plasticated mixture to form an extruded plasticated mixture, and
   shaping said plasticized mixture to form panels.

2. Method according to claim 1, further comprising an intermediate step of embedding at least one reinforcement element in said extruded plasticized mixture.

3. Method according to claim 1, further comprising the steps of;
   laminating said extruded plasticated mixture to produce a laminated material having at least one side and at least one other side,
   applying a plastic material to said at least one side of said laminated material,
   cooling said laminated material, and
   cutting said laminated material into panels.

4. Method according to claim 1, further comprising the steps of;
   laminating said extruded plasticated mixture to produce a laminated material having at least one side and at least one other side,
   applying a plastic material to said at least one side and to said at least one other side of said laminated material,
   cooling said laminated material, and
   cutting said laminated material into panels.

5. Method according to claim 1, further comprising the steps of;
   embedding at least one reinforcement element in said extruded plasticized mixture,
   laminating said extruded plasticated mixture to produce a laminated material having at least one side and at least one other side,
   applying a plastic material to said at least one side and to said at least one other side of said laminated material,
   cooling said laminated material, and
   cutting said laminated material into panels.

6. Method according to claim 5, further comprising the step of applying a finishing material to said plastic material applied to said at least one side of said panel.

7. Method according to claim 6, wherein said finishing material is aluminum.

8. Method according to claim 6 wherein said finishing material is a fabric.

9. Method according to claim 1, further comprising the step of hot moulding said panels thereby forming items having different shapes.

10. Method of making panels from an organic filler and a thermoplastic resin selected from a group consisting of polyethylene, polypropylene and polyvinylchloride, alone or in mixture, said method comprising the steps of;
    providing an organic filler tank,
    bulk feeding said organic filler to said organic filler tank,
    moving at least some of said organic filler from said organic filler tank,
    substantially metering a quantity of said organic filler moved from said organic filler tank to provide a substantially metered quantity of organic filler,
    providing a double volute,
    moving said substantially metered quantity of organic filler to said double volute,
    counter rotating said double volute, thereby mixing said organic filler and conveying said organic filler along said double volute,
    heating said organic filler thereby substantially desiccating said organic filler,
    feeding at least one first charge of thermoplastic resin into said organic filler, thereby substantially lubricating said organic filler,
    degassing said organic filler and said first charge of thermoplastic resin,
    adding at least one second charge of thermoplastic resin to said organic filler and said first charge of thermoplastic resin to form a mixture containing from over 60% to 80% by weight of organic filler and from under 40% to 20% by weight of thermoplastic resin,
    degassing said mixture,
    plasticizing said mixture to form a plasticated mixture, extruding said plasticated mixture to form an extruded plasticated mixture, lamianting said extruded plasticated mixture to produce a laminated material having at least one side and at least one other side, applying a plastic material to said at least one side and to said at least one other side of said laminated material, cooling said laminated material, and cutting said laminated material into panels.

11. Method according to claim 10, further comprising the step of applying a finishing material to said plastic material applied to said at least one side of said laminated material.

12. Method according to claim 10, further comprising the step of hot moulding said panels.

13. Method according to claim 11, wherein said finishing material is aluminum.

14. Method according to claim 11 wherein said finishing material is a fabric.

15. Method according to claim 10, further comprising the intermediate step of embedding at least one reinforcement element in said extruded plasticized mixture.

16. Method of making panels from an organic filler and a thermoplastic resin selected from a group consisting of polyethylene, polypropylene and polyvinylchloride, alone or in mixture, said method comprising the steps of;

providing an organic filler tank, bulk feeding said organic filler to said organic filler tank, moving at least some of said organic filler from said organic filler tank, substantially metering a quantity of said organic filler moved from said organic filler tank to provide a substantially metered quantity of organic filler, providing a double volute, moving said substantially metered quantity of organic filler to said double volute, counter rotating said double volute, thereby mixing said organic filler and conveying said organic filler along said double volute, heating said organic filler thereby substantially desiccating said organic filler, feeding at least one first charge of thermoplastic resin into said organic filler, thereby substantially lubricating said organic filler, degassing said organic filler and said first charge of thermoplastic resin, adding at least one second charge of thermoplastic resin to said organic filler and said first charge of thermoplastic resin to form a mixture containing from mover 60% to 80% by weight of organic filler and from under 40% to 20% by weight of thermoplastic resin, degassing said mixture, plasticizing said mixture to form a plasticated mixture, extruding said plasticated mixture to form an extruded plasticated mixture, laminating said extruded plasticated mixture to produce a laminated material having at least one side at least one other side, cooling said laminated material, cutting said laminated material into panels, and hot moulding said panels to form items having different shapes.

17. Method according to claim 16, further comprising the intermediate steps of;

embedding at least one reinforcement element in said extruded plasticized mixture, applying a plastic material to said at least one side and to said at least one other side of said laminated material, and applying a finishing material to said plastic material applied to said at least one side of said laminated material.

18. Method according to claim 16, wherein said finishing material is aluminum.

19. Method according to claim 16, wherein said finishing material is a fabric.

* * * * *